Jan. 5, 1954
L. M. HARDY
2,664,879
INSTRUMENT FOR TESTING PH VALUES OF BODY
CANAL LIQUIDS AND COLOR COMPARATOR
FOR USE THEREWITH
Filed Sept. 8, 1950
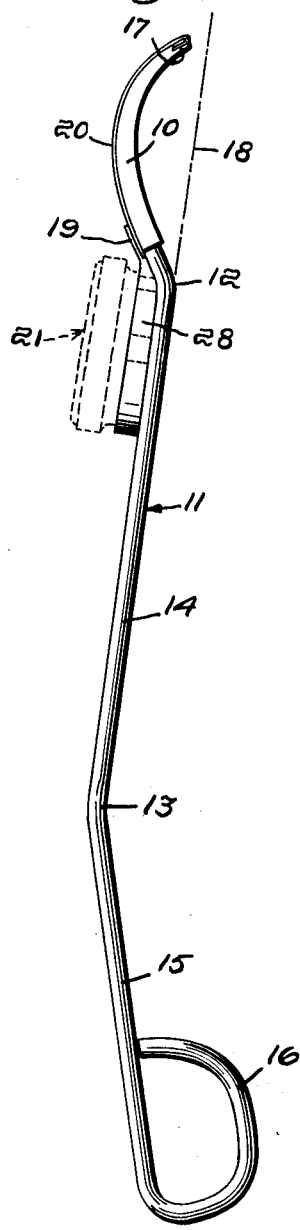
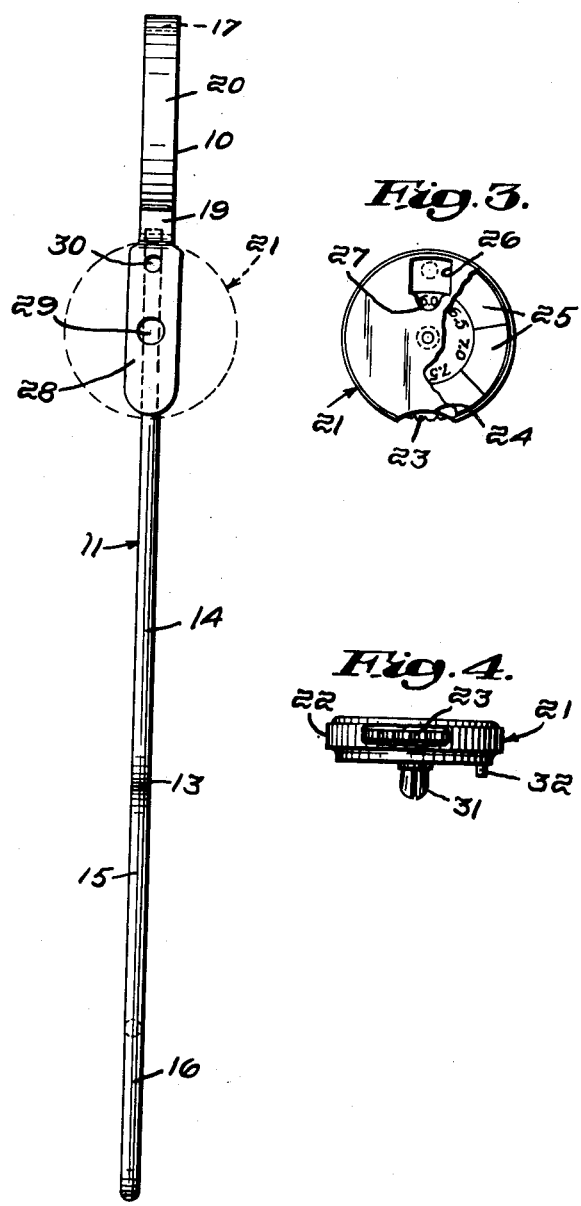
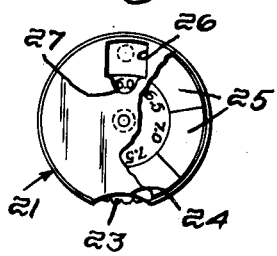
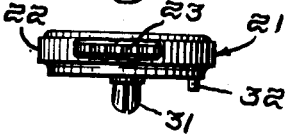
Inventor:
Lowell M. Hardy,
by Abbott Spear
Attorney Patented Jan. 5, 1954

2,664,879

UNITED STATES PATENT OFFICE 2,664,879

INSTRUMENT FOR TESTING pH VALUES OF BODY CANAL LIQUIDS AND COLOR COMPARATOR FOR USE THEREWITH

Lowell Macomber Hardy, Portland, Maine

Application September 8, 1950, Serial No. 183,774

6 Claims. (Cl. 128—2)

My present invention relates to an instrument for use in testing the pH value of body canal liquids by means of a paper strip treated to change color when moistened by such a liquid to indicate its alkaline or acid state.

In the diagnosis, treatment, and research of various diseases and conditions, it is important for the doctor to know what pH values are present in a body canal. For example, some vaginal diseases can be effectively treated only by establishing a predetermined pH value in that canal. The normal pH of that canal varies in different sections thereof and, as a consequence, both during diagnosis and treatment, it is necessary for the doctor to test the pH value of a predetermined section of it.

A broad objective of my invention is to provide an instrument to enable such pH testing to be effected easily, quickly, and accurately. I accomplish that objective by means of an instrument having a head including a convex contact portion and means associated with the head to receive the ends of the test strip thereby to lock it against the contact portion. The instrument also includes a supporting shank of sufficient length to enable the head to be inserted, usually through a speculum, into the canal and to be passed therealong and its strip covered bearing portion brought into contact with that part of the canal, the pH value of which is to be tested.

Another objective of my invention is to further increase the ease and accuracy of such pH testing by providing a unit attachable to my instrument carrying a movable color chart and indicia relating to its interpretation so that the chart may be moved adjacent and relative to the moistened test strip to facilitate color comparison.

In the accompanying drawings, I have shown an illustrative embodiment of my invention from which these and other of its novel features and advantages will be readily apparent.

In the drawings:

Fig. 1 is a side view of an illustrative embodiment of my invention.

Fig. 2 is a top plan view of the instrument shown in Fig. 1, and

Figs. 3 and 4 are partly broken away top and side views, respectively, of an illustrative attachment for the instrument for use in determining the pH value of the tested area by a comparison of the color of the test strip with those of the color chart.

In the embodiment of my invention shown in the drawings, I have indicated a head 10 having a convex bearing or contact portion and having, at one end, a supporting shank 11. The shank 11 has reversely disposed bends 12 and 13 establishing an intermediate part 14 and an end part 15 terminating in a handle 16.

It is essential that the head 10 have a contact portion of a generally convex form and in order that such portion may be of substantial length and relatively light in weight, I prefer that it be narrow, of arcuate shape, and decrease in thickness towards its free end or tip which is provided with a transverse slit 17. Preferably, the tip terminates short of the dotted line 18, which represents the path of the shank part 14 as my instrument is inserted into or withdrawn from a canal.

Adjacent the rear end of the head 10, I provide my instrument with a lip 19 which overlies the rear part of the convex contact surface of the head to anchor one end of a paper strip 20, the other end of which is securely caught in the slit 17 thereby to provide means to attach the strip 20 and hold it in place, firmly backed by the contact portion of the head 10. The strip 20 is of paper stock, sensitized to change color in predetermined relation to the relative acidity or alkalinity of the liquid with which it is moistened.

For most uses, an instrument in accordance with my invention is used with a speculum to facilitate both the entrance of the instrument into a canal and the illumination and examination of that canal. In this connection, it will be noted that the handle 16 is so disposed that the hand of the doctor or nurse by which the instrument is held and guided, does not block visibility of the canal or the relation of the head thereto.

With the instrument, as thus described, any selected part of a canal may be accurately contacted by the strip 20 and moistened by its mucous coating. The moistened strip 20 changes color and the pH value of the canal, as represented by the liquid in the tested zone, may be determined by comparing its color with a color chart having associated with each of its color shades, the pH value represented by that color or shade thereof.

In order that such color comparisons may be made with maximum convenience and accuracy, I have shown a comparator unit, generally indicated at 21, that is attachable to the instrument after a test has been made. The unit 21 consists of a cylindrical casing 22 having a disc 23 rotatably housed thereby. The side of the casing 22 is open as at 24 so that the periphery of the disc 23 may be digitally engaged and rotated. The upper surface of the disc 23 is provided with a plurality of colored panels 25 adjacent its periphery and inwardly of each panel 25 is the numerical designation of the pH value of that color. I provide the casing 22 with a window 26 preferably of the same size and shape as each of the panels 25 and having a notch-like part 27 through which the numeral designation of pH value is visible when no part of an adjacent panel is visible.

In order that the comparator unit 21 may be quickly and easily attached to or detached from my instrument, I provide the instrument with a rib portion 28 which may conveniently include the lip 19 and which has recesses 29 and 30. Centrally of the casing 22 is a split leg 31 having a resilient friction fit in the recess 29 and adjacent its periphery is a leg 32 disposed to enter the recess 30 to hold the attached unit 21 against rotation when attached to the instrument.

It will be apparent that the comparator unit 21 greatly facilitates the determination of the pH value of the test strip 20, for, when attached to the instrument, each panel, when visible through the window 26, is located adjacent and in alinement with an end of the strip 20. A single color comparator unit 21 can, of course, be used to service a number of instruments.

From the foregoing, it will be appreciated that my instruments are simple and inexpensive to manufacture and are well adapted to meet the requirements of the doctor in diagnosis, treatment, and research of diseases and conditions of body canals.

What I therefore claim and desire to secure by Letters Patent is:

1. An instrument for use in testing the pH value of body canal liquids with a paper strip sensitized to change color, when wetted by a liquid, to indicate its relative acidity or alkalinity, said instrument comprising a relatively long and narrow arcuate head, a shank connected at one end to the rear end of said head and at its other end including a handle, the front end of said head having a transverse slit to anchor one end of said strip, and said instrument including a lip overlying the rear end of said head to lock the anchored strip against the convex surface of said head.

2. The instrument of claim 1 in which the shank includes a first bend adjacent the head and a second bend adjacent the handle and spaced from the first bend to establish an intermediate part of substantial length, each bend being in a direction opposite to the other.

3. An instrument for use in testing the pH value of body canal liquids with a paper strip sensitized to change color, when wetted by a liquid, to indicate its relative acidity or alkalinity, said instrument comprising a relatively long and narrow arcuate head, a shank connected to said head and including a handle, the front end of said head having a transverse slit to anchor one end of said strip, said handle including a flat surfaced rib portion adjacent the other end of said head and including a lip overlying that end of the head to anchor the other end of said strip against the convex surface of said head.

4. An instrument for use in testing the pH value of body canal liquids with a paper strip sensitized to change color, when wetted by a liquid, to indicate its relative acidity or alkalinity, said instrument comprising a head including a convex contact portion, a supporting shank for said head, means associated with said head to receive the ends of said strip thereby to lock it against said contact portion, and a unit, said unit including a casing having a window adjacent the rear end of said head, and a member movably mounted in said casing and having a plurality of colored panels disposed to be selectively exposed through said window as said member is moved and means detachably connecting said casing to said shank.

5. An instrument for use in testing the pH value of body canal liquids with a paper strip sensitized to change color, when wetted by a liquid, to indicate its relative acidity or alkalinity, said instrument comprising a head including a convex contact portion, a supporting shank for said head, a support carried by said shank adjacent the rear end of said head and including a lip disposed with reference to said rear end to establish means to anchor one end of said strip, said head including means to anchor the other end of said strip to lock said strip against said contact portion, a unit comprising a casing, a disc rotatable in said casing and having a plurality of colored panels adjacent its periphery, said casing having an opening exposing a part of said disc to enable it to be digitally engaged and rotated and a window through which said panels are successively exposed as said disc is rotated, and said support and said unit including complemental means detachably interconnecting them with said casing window adjacent and in alinement with said head and with said casing held against rotation.

6. The instrument of claim 5 in which the means connecting the casing to the support consists of first and second depending legs carried by the casing and the support has first and second leg receiving recesses, the first leg including first and second portions yieldably entrant of the first recess to lock therein and the second leg functioning to hold the casing against rotation when entrant of the second recess.

LOWELL MACOMBER HARDY.

References Cited in the file of this patent
UNITED STATES PATENTS

| Number | Name | Date |
|---|---|---|
| 592,154 | Marsh | Oct. 19, 1897 |